United States Patent Office 3,197,514
Patented July 27, 1965

3,197,514
PROCESS FOR THE PREPARATION OF
2-BROMO 3-HALO PROPENE-1
Hendricus Gerardus Peer, Rijswijk, South Holland, Netherlands, assignor to The Nederlandse Organisatie voor Toegepast - Natuur - Wetenschappelijk Onderzoek ten Behoeve van Nijverheid, Handel en Verkeer, The Hague, Netherlands, a corporation of the Netherlands
No Drawing. Filed Mar. 16, 1961, Ser. No. 96,102
Claims priority, application Great Britain, Mar. 28, 1960, 10,897/60, 10,898/60; May 20, 1960, 17,889/60
The portion of the term of the patent subsequent to Nov. 11, 1980, has been disclaimed
4 Claims. (Cl. 260—654)

This invention relates to a process for the preparation of 2,3-dibromo propene-1 and of 2-bromo 3-chloro propene-1; in the specification and claims these products are covered by the term 2-bromo 3-halo propene-1.

It has been found that 2-bromo 3-halo propene-1 can be obtained in a good yield by reacting allene $$(CH_2=C=CH_2)$$

with either bromine or a mixture of bromine and chlorine in the presence of an inert solvent. If bromine is used 2,3-dibromo propene-1 ($CH_2=CBr-CH_2Br$) is formed. If a mixture of bromine and chlorine is used 2-bromo 3-chloro propene-1 ($CH_2=CBr-CH_2Cl$) is formed.

The term "inert solvent" as used herein means a solvent which, under the reaction conditions, does not appreciably react either with the reactants or with the reaction products; examples of such solvents are chloroform and carbon tetrachloride.

The 2-bromo 3-halo propene-1 as defined herein before is a valuable compound for instance as a nematocide.

When working in a dilute system in glacial acetic acid, the reaction of allene with bromine takes place at one of the two double bonds of the allene only, the resulting product being 2,3-dibromo propene-1.

EXAMPLE 1

Into a solution of 4 cc. of bromine in 800 cc. of glacial acetic acid at room temperature, allene ($CH_2=C=CH_2$) is introduced at a rate of 20 cc. per minute until the solution becomes colourless. The introduction of allene is then stopped and nitrogen is passed through the reaction mixture in order to remove a possible excess of allene. The reaction mixture is then poured out into 1600 cc. of ice water, 600 cc. of ether is added and, while cooling with ice, the mixture is neutralised with aqueous NaOH (20%). The ethereal layer is separated, dried over anhydrous sodium sulphate and fractionated.

The yield of 2,3-dibromo propene-1 is about from 60 to 80% calculated on the amount of bromine originally present; boiling point at 60 mm. Hg from 67 to 70° C.; bromine content 77.7%; identification by means of infrared analysis shows that the substance is indeed 2,3-dibromo propene-1.

In this case no other substances and especially no tetra-bromo propane can be found in the reaction mixture nor in the final product.

The mixture of glacial acetic acid and 2,3-dibromo propene-1 formed in the reaction can be separated by fractional distillation.

In other inert solvents tetrabromo propane $$(CH_2Br-CBr_2-CH_2Br)$$

may also be formed by the reaction between bromine and allene, although under specific conditions the process leads to the formation of substantially only 2,3-dibromo propene-1.

EXAMPLE 2

Allene is dissolved in 75 ml. of $CHCl_3$ bromine dissolved in 125 ml. of $CHCl_3$ is added in the dark over a period of 3½ hours while stirring, stirring is continued for an hour, the reaction mixture is shaken with an aqueous solution of $NaHCO_3$ (5%), then with water and finally dried over anhydrous $Na_2SO_4$, the chloroform is removed by distillation and the residue is fractionated.

The results are recorded in Table I. In the first, second and fifth experiments the temperature is minus 17° C.; in the third experiment it is 20° C.; in the fourth experiment it is 30° C. This table shows that it is possible to obtain dibromo propene-1 as the main or even sole reaction product. The dibromo compound is denoted by di-BP; the tetrabromo propane by tetra-BP.

Table I

| $C_3H_4$ in ml. | Bromine added in grams | Molar ratio $Br_2:C_3H_4$ | Fraction No. | | Yield percent | | Molar ratio di-BP: tetra-BP |
|---|---|---|---|---|---|---|---|
| | | | di-BP | tetra-BP | di-BP | tetra-BP | |
| 3357 | 12 | 0.5 | 4 | 4-a | 69 | Nil | 100:0 |
| 2953 | 21.3 | 1.0 | 5 | 5-a | 65 | Nil | 100:0 |
| 3442 | 24.8 | 1.0 | 6 | 6-a | 61 | 4 | 97:3 |
| 2430 | 17.4 | 1.0 | 7 | 7-a | 65 | nil | 100:0 |
| 3353 | 48.3 | 2.0 | 8 | 8-a | 26 | 26 | 50:50 |

Fraction No. 4 is 10.4 g. boiling at 68 to 72° C. at 60 mm. Hg;
Fraction No. 4-a is nil g.;
Fraction No. 5 is 17.1 g. boiling at 68 to 70° C. at 60 mm. Hg;
Fraction No. 5-a is nil g.;
Fraction No. 6 is 18.9 g. boiling at 68 to 72° C. at 60 mm. Hg;
Fraction No. 6-a is 1.2 g. boiling at 123 to 140° C. at 17 mm. Hg;
Fraction No. 7 is 14.1 g. boiling at 67 to 69° C. at 60 mm. Hg;
Fraction No. 7-a is nil;
Fraction No. 8 is 8 g. boiling at 68 to 72° C. at 60 mm. Hg;
Fraction No. 8-a is 14.5 g. boiling at 123 to 133° C. at 17 mm. Hg.

If instead of chloroform carbon tetrachloride is used under the same conditions as in Example 2, similar results are obtained; vide Table II. In all cases the temperature is —17° C.

Table II

| $C_3H_4$ in moles | Bromine added in moles | Molar ratio $Br_2:C_3H_4$ | Fraction No. | | Yield percent | | Molar ratio di-BP: tetra-BP |
|---|---|---|---|---|---|---|---|
| | | | di-BP | tetra-BP | di-BP | tetra-BP | |
| 0.15 | 0.075 | 0.5 | 9 | 9-a | 77 | Nil | 100:0 |
| 0.15 | 0.15 | 1.0 | 10 | 10-a | 47 | 9 | 85:15 |
| 0.10 | 0.20 | 2.0 | 11 | 11-a | 47.6 | 17 | 74:26 |

In the first two experiments the yield is calculated on the total of bromine added; in the last experiment on $C_3H_4$.

Fraction No. 9 is 11.8 g. boiling at 68 to 69° C. at 60 mm. Hg;

Fraction No. 9-a is nil g.;

Fraction No. 10 is 14.5 g. boiling at 68° C. at 60 mm. Hg;

Fraction No. 10-a is 5.0 g. boiling at 124 to 128° C. at 17 mm. Hg;

Fraction No. 11 is 10 g. boiling at 68 to 70° C. at 60 mm. Hg;

Fraction No. 11-a is 7.3 g. boiling at 126 to 140° C. at 17 mm. Hg.

2,3-dibromo propene-1 can be used as a nematocide.

If instead of chloroform as the solvent methylene chloride is used, at −17° C. and 1 mol bromine per 1 mol of allene, a molar ratio of di-BP to tetra-BP of 93:7 is found.

As stated hereinbefore, 2-bromo 3-chloro propene-1 is obtained if allene is reacted with a mixture of chlorine and bromine in the presence of an inert solvent.

The best results are obtained by using substantially equimolar quantities of chlorine and bromine.

EXAMPLE 3

19.5 grams of bromine (0.12 mole) are introduced into a solution of 8.7 grams of chlorine (0.12 mole) in 243 grams of carbon tetrachloride. This solution is then slowly added dropwise in the dark and with a nitrogen atmosphere to a solution of 5470 ml. (0.245 mole) of allene in 350 grams of carbon tetrachloride at minus 30° C. The mixture is kept at this temperature for one hour and for a further two hours at +20° C. After this the reaction mixture is shaken with an aqueous solution of sodium bicarbonate (5%), then with water and is finally dried over anhydrous $Na_2SO_4$.

The solvent is removed by distillation and further distillation gives four fractions, vide Table III.

Table III

| Fraction | Weight in grams | Boiling point in ° C. | $n_D^{20}$ |
| --- | --- | --- | --- |
| 1 | 0.4 | 65–92 | 1.4739 |
| 2 | 2.6 | 92–113 | 1.4951 |
| 3 | 14.4 | 113–114 | 1.4992 |
| 4 | 7.4 | 38–99/11 mm. Hg | |

The third fraction consists substantially of 2-bromo 3-chloro propene-1 as is shown by chemical analysis, boiling point and infrared spectrography which produce values which are the same as those obtained with a control sample of 2-bromo-3-chloro propene-1.

Fraction 2 probably contains 2,3-dichloro propene. Fraction 4 probably contains tetrahalogenation products.

The yield of 2-bromo 3-chloro propene-1 is 41% calculated on the allene consumed. It is possible to improve this yield by decreasing the amount of halogen used with respect to the amount of allene.

The identification of the fractions is by infrared spectrography by determination of the halogen content and by refractive index. A typical fraction consisting of substantially solely 2,3-dibromo propene-1 had a bromine content of 79.1 (theoretically it is 80) and an $n_D^{20}=1.5378$. A typical fraction consisting of substantially solely tetrabromo propane had a bromine content of 88.60 (theoretically it is 88.89) and an $n_D^{20}=1.6158$.

If Example 3 is repeated but instead of carbon tetrachloride as the solvent glacial acetic acid is used, there is a very substantial formation of 2-bromo 3-acetoxy propene-1 and no 2-bromo 3-chloro propene-1 can be found in determinable quantities. The possible reason of this behaviour will be explained below.

The reaction scheme is probably as follows. The chemical structure of allene is (1) $\qquad CH_2=(2)C=(3)CH_2$ in which the figures between parentheses denote the numbering of the carbon atoms.

In the presence of bromine a bromination takes place at one of the double bonds, say at the double bond between carbon atoms (2) and (3). This addition of bromine starts with a primary addition of a positive bromine $Br^+$-ion:

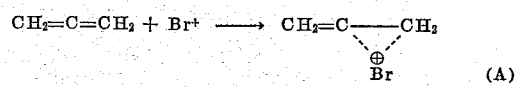

The structure (A) may be called a bromonium ion. This structure (A) seeks to be stabilized.

If the solvent is inert and bromine is the sole halogenation agent, said stabilization takes place by incorporation of a negative bromine $Br^-$-ion:

$(A)+Br^- \rightarrow CH_2=CBr-CH_2Br$ thus leading to the formation of 2,3-dibromo propene-1.

If the solvent is inert and a mixture of bromine and chlorine is used it should be noted that such a mixture reacts as if it were the compound $Br^+Cl^-$ and consequently said stabilization takes place by incorporation of a negative chlorine $Cl^-$-ion:

$(A)+Cl^- \rightarrow CH_2=CBr-CH_2Cl$ thus leading to the formation of 2-bromo 3-chloro propene-1.

The examples show that a solvent such as glacial acetic acid is inert if halogenation is done with bromine. But if halogenation is done with a mixture of bromine and chlorine (i.e. with $Br^+Cl^-$) it is not 2-bromo 3-chloro propene-1 which is formed but 2-bromo 3-acetoxy propene-1; this is accounted for by the fact that negative chlorine $Cl^-$-ions are markedly less nucleophilic than acetoxy-ions so that (A) is stabilized as follows:

$(A)+CH_3COO^- \rightarrow CH_2=CBr-CH_2OOCCH_3$ thus leading to the formation of 2-bromo 3-acetoxy propene-1. In this case glacial acetic acid is not inert.

The fact that by solely using bromine and glacial acid as the solvent no 2-bromo 3-acetoxy propene-1 is formed but 2,3-dibromo propene-1 proves that the negative bromine $Br^-$-ion is more nucleophilic than the acetoxy-ion.

As appears from the examples and the tables the first step of the halogenation is an attack on only one of the two double bonds of allene and in some solvents and under certain conditions the addition of bromine stops at this stage. In other solvents such as ether there is a secondary addition at the second double bond of allene, leading to the formation of tetrabromo propane although even then this second addition can be suppressed to an appreciable extent by varying the ratio of bromine to allene.

Examples of the latter type of inert solvents are ether, benzene, dioxane, ethyl acetate and carbon disulphide. In these solvents with an initial ratio of 1 mol bromine per 1 mol allene and bromination at 20° C. in the dark, in the final mixture about 3 to 4 moles of 2,3-dibromo propene-1 per 1 mol tetrabromo propane are found. By increasing the amount of allene to about 2 mol per mol of bromine the formation of the tetrabromo compound is suppressed in favour of the formation of the dibromo compound. In ether as the solvent and an amount of 2 moles of allene per mol of bromine, bromination in the dark at 0° C. leads to the formation of the dibromo compound in a molar ratio of about 9 moles per mol of the tetrabromo compound.

But with halogenated hydrocarbons such as carbon tetrachloride, chloroform and methylene chloride ($CH_2Cl_2$), the formation of the dibromo compound is very much more predominant than the formation of the tetrabromo compound even if an excess of bromine is used. In general better results are obtained at lower temperatures of reaction. For instance with methylene chloride as the solvent at $+20°$ C. rather much tetrobromo propane is formed.

It is advisable to use a solvent having at a specified pressure a boiling point substantially different from the boiling point of the 2-bromo 3-halo propene-1 for in such a case separation of said compound from the solvent can easily be done by fractional distillation.

Separation of the reaction product from a water-miscible inert solvent is also possible by adding to the reaction mixture a substance such as water which precipitates the reaction product. Other methods for such a separation can easily be devised by any one, skilled in the art.

All experiments recorded in the examples and the tables are on a laboratory scale. The yields are calculated on the initial amount of bromine, unless otherwise stated. The yields do not add up to 100 because some bromine gets lost, partly in unidentified products. It stands to reason that the yields may be substantially improved if the process is carried out in a large scale apparatus because then slight losses during the isolating steps have only a slight effect upon the yield.

What is claimed is:

1. A process for the production of substantially pure 2,3-dibromo-propene-1 which comprises the steps of reacting up to the stoichiometric amount of bromine with a solution of allene in a solvent selected from the group consisting of glacial acetic acid, carbon tetrachloride, chloroform and methylene dichloride and recovering said 2,3-dibromo-propene-1 to the substantial exclusion of tetrabrominated products.

2. The process of claim 1 wherein said bromine is dissolved in said solvent and reacted with said solution of allene in the same solvent.

3. The process of claim 1 wherein said bromine is dissolved in said solvent and allene is added thereto.

4. The process of claim 1 wherein said bromine in gaseous form is passed into said solution of allene in said solvent.

References Cited by the Examiner
UNITED STATES PATENTS

| | | | |
|---|---|---|---|
| 2,973,393 | 2/61 | Monroe | 260—654 |
| 3,009,967 | 11/61 | Monroe | 260—654 |
| 3,110,740 | 11/63 | Peer | 260—654 |

OTHER REFERENCES

Lespieau et al.: Bull. Soc. Chem. (France), vol. 45, part 2, p. 632 (1929).

LEON ZITVER, *Primary Examiner.*

ALPHONSO D. SULLIVAN, *Examiner.*